United States Patent [19]
Lutovsky et al.

[11] Patent Number: 5,567,028
[45] Date of Patent: Oct. 22, 1996

[54] MECHANISM FOR TRANSLATING STORAGE BIN

[75] Inventors: Arnold J. Lutovsky, Federal Way; Richard Dahlen, Kirkland, both of Wash.

[73] Assignee: The Boeing Company, Seattle, Wash.

[21] Appl. No.: 396,159

[22] Filed: Feb. 27, 1995

[51] Int. Cl.⁶ ....................................................... A47F 5/08
[52] U.S. Cl. ........................................... 312/246; 312/248
[58] Field of Search .................................. 312/246, 242, 312/248, 319.6, 319.2, 325, 24, 27

[56] References Cited

U.S. PATENT DOCUMENTS

| | | |
|---|---|---|
| 4,275,942 | 6/1981 | Steidl . |
| 4,368,937 | 1/1983 | Palombo et al. . |
| 5,096,271 | 3/1992 | Poortman ............................ 312/248 X |
| 5,244,269 | 9/1993 | Harriehausen et al. . |
| 5,441,218 | 8/1995 | Mueller et al. ...................... 312/248 X |
| 5,456,529 | 10/1995 | Cheung ............................... 312/248 X |

OTHER PUBLICATIONS

*Airbus Update,* date unknown, showing new stowage bins for A330 and A340 customers.

*Primary Examiner*—Peter M. Cuomo
*Assistant Examiner*—Rodney B. White
*Attorney, Agent, or Firm*—Christensen O'Connor Johnson & Kindness PLLC

[57] ABSTRACT

An overhead storage compartment that may be reconfigured to account for different seating configurations. The storage bin includes an overhead structure that is attached to the ceiling of an aircraft. A storage bin is mounted within the overhead structure by an extension/retraction mechanism. The extension/retraction mechanism may be easily reconfigured to allow the storage bin to move either approximately linearly downward or downward and outward depending upon the application. The retraction mechanism includes an upper link and a lower link connected between the support structure and the storage bin. A drive link is connected between the upper link and an idler link. A balance spring is connected between an intersection of the idler link and the drive link and the support structure. The retraction mechanism also includes a snubber connected between the upper link and the lower link.

13 Claims, 3 Drawing Sheets

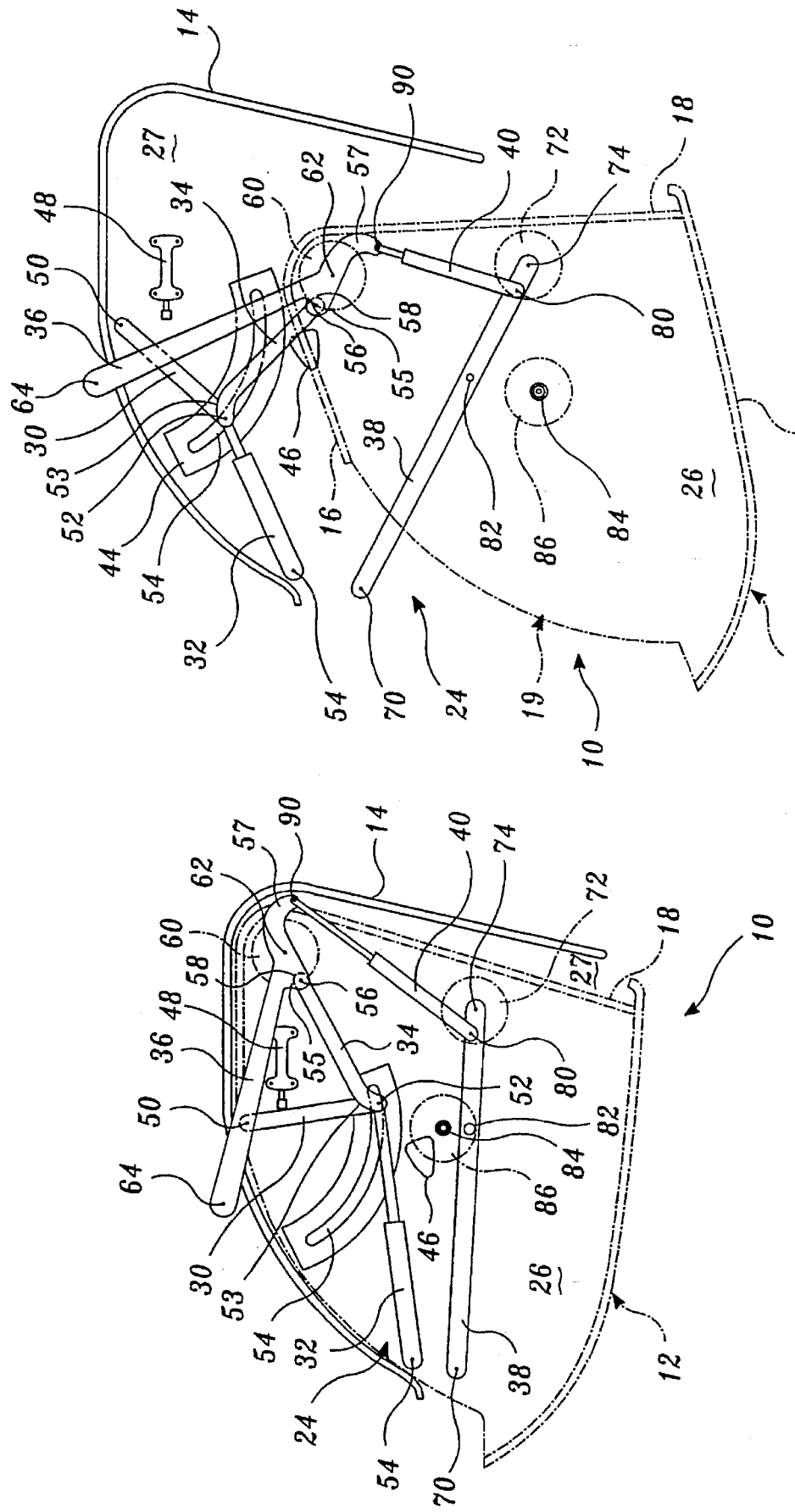

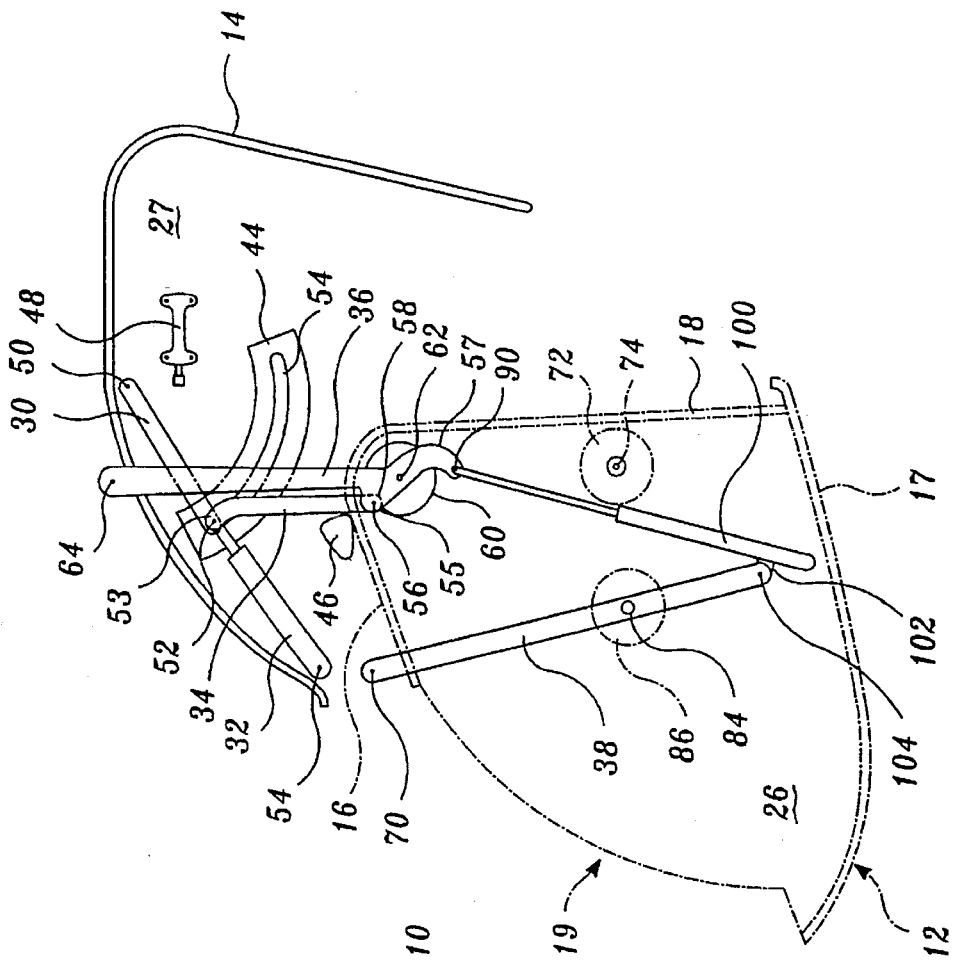
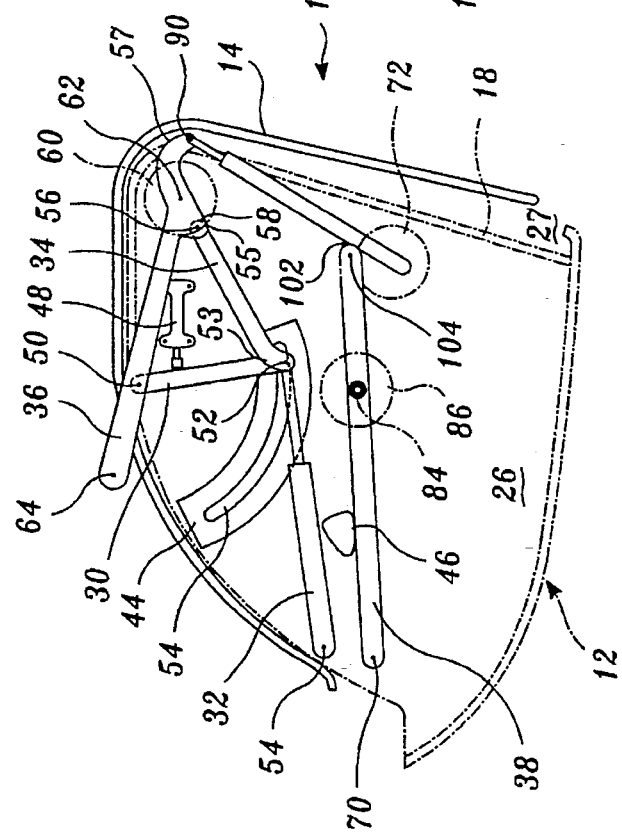
Fig. 5.
Fig. 4.

MECHANISM FOR TRANSLATING STORAGE BIN

FIELD OF THE INVENTION

The invention relates to overhead storage compartments with lowerable storage bins, more specifically, the invention relates to overhead storage compartments for use on passenger aircraft and the like.

BACKGROUND OF THE INVENTION

Storage compartments with lowerable storage bins have been widely used on commercial aircraft and in other applications for a number of years. Storage compartments are generally located along the sides of the aircraft and down the center of the aircraft above the seats in the passenger compartment. Regardless of the location, it is advantageous that the storage compartments be located at a sufficient height as not to significantly interfere with passenger movement within the aircraft. It is also advantageous that the storage bins of the storage compartments be sufficiently low when opened to allow passengers to easily place luggage and other carry-on items within the storage bins.

In order to achieve the above-mentioned goals, past storage compartments have included storage bins that are mounted within support structures or flames on the sides and center of the aircraft's passenger compartment. The storage bins are generally mounted so that a passenger may grasp a handle located in the center of the storage bins and pull the storage bin downward. As a passenger asserts a downward force on the storage bin, the storage bin swings downward out of the overhead support structure. The lowered storage bin allows a passenger easier access to the interior of the storage bin. U.S. Pat. Nos. 4,275,942 (Steidl); 368,937 (Palombo et al.) and 5,244,269 (Harriehausen et at.) disclose three different overhead storage compartments that function as discussed above.

One disadvantage of past overhead storage compartments is that they are configured to allow the storage bins to lower along a single pre-determined path. The seating configurations on commercial aircraft, on the other hand, are readily reconfigurable to allow different seat spacing, seat widths, and number of seats across the width of the cabin. Although past storage compartments are advantageously configured for a specific seating configuration, they are difficult for passengers to use if other seating configurations are employed.

For illustration, consider an overhead storage compartment for use in a first-class seating configuration in which there are two seats located in the center of the aircraft and two seats located along each side of the aircraft. Overhead storage compartments designed for use in such a seating configuration are generally located along the sides of the aircraft and down the center of the aircraft. The storage compartments are generally configured so that the storage bins are located directly above the seats closest to the aisles of the aircraft. This configuration allows passengers standing in the aisles to easily reach up and pub down the storage bins. As the storage bins move downward, they do so directly over the seats closest to the aisle, thus allowing passengers easy access to the interior of the storage bins.

Now consider the same storage compartments used in an economy class configuration having five seats located down the center of the aircraft mad two seats along each side of the aircraft. In the economy class seating configuration, the center overhead storage compartments are no longer located directly over the seats nearest the aisles of the aircraft. Instead, the storage compartments are spaced inward from the center seats. The passengers must now reach over the seat located nearest the aisle to grasp the handle of the overhead storage bin and pull the storage bin down. Alternatively, passengers must walk into the space between the rows of seats in order to grasp the handle of the overhead storage bin. This option may not be available if passengers are already seated in the seats nearest the aisle. Once a passenger pubs down on the handle of the storage bin, the overhead storage bin lowers downward. However, instead of lowering directly over the seats closest the aisle, the overhead storage bins lower over the interior seats making it difficult for the passenger to access the interior of the storage bin.

Past storage compartments either inconvenience passengers when different seating configurations are used or are retrofitted at the same time the seating configuration is altered. Retrofitting storage compartments involves either removing the storage compartments and replacing them with different storage compartments or at minimum removing the storage bin's movement mechanisms, designing new mechanisms and retrofitting the storage compartments with the new movement mechanism. In either case, retrofitting the preexisting storage compartments is time-consuming and adds to the expense of reconfiguring the aircraft's seating. In addition, in order to meet the need for seating reconfiguration, manufacturers manufacture several different models of storage compartments.

Thus, there exists the need for improved overhead storage compartments that lend themselves to use with different seating configurations without the need to replace the storage compartments or entire movement mechanism. The present invention is directed toward fulfilling this need.

SUMMARY OF THE INVENTION

In accordance with the present invention an overhead storage compartment for an aircraft or other application is provided. The overhead storage compartment raises and lowers approximately linearly downward from an overhead support structure or swings downward and outward from the overhead support structure to accommodate different seating configurations.

In one embodiment of the invention, the storage compartment includes an overhead structure in which an overhead storage bin is mounted. An extension/retraction mechanism is connected between both sides of the storage bin and the overhead support structure. The extension/retraction mechanism is reconfigurable between two different configurations. In the first configuration, the storage bin is movable between a stowed position in which it is nestled into the support structure to an extended position in which it is spaced approximately linearly downward from the support structure. In the second configuration, the storage bin is movable from the stowed position to an extended position in which the storage bin is spaced downward and outward from the support structure.

In accordance with further aspects of the invention, the extension/retraction mechanism includes an upper link and a lower link connected between the support structure and the storage bin. A drive link is connected between the upper link and an idler link and a balance spring is connected between an intersection of the idler link and the drive link and the support structure. The retraction mechanism also includes a snubber connected between the upper and lower links.

In accordance with other aspects of the invention, the compression snubber is used in the first configuration and a tension snubber is used in the second configuration. The storage compartment may also include a dash pot to cushion the retraction of the storage bin and a down stop to limit the downward displacement of the storage bin.

The storage compartment of the present invention is readily adapted between the first and second configurations. Therefore, the storage compartment can be easily reconfigured to accommodate different seating configurations.

The ability of the storage compartment of the present invention to be easily reconfigured reduces the time and expense required to change seating and storage configurations over prior storage compartments. The storage compartment of the invention also allows passengers to easily access the interior of the storage bin regardless of the seating configuration.

For example, in a first class seating configuration having two seats on either side of the aircraft and two seats in the center of the aircraft, the storage compartment may be configured in the first configuration. In the first configuration, the storage bin lowers to a lowered position directly over the center seats thus allowing passengers easy access to the bin's interior. In an economy class seating configuration having five seats in the center of the aircraft, the storage compartment is used in its second configuration. In the second configuration, the storage bin moves both downward and outward towards the aisle of the aircraft as the storage bin is lowered to its lowered position. This movement allows the storage bin to move outward over the seats nearest the aisles of the aircraft, thus allowing passengers ease of access to the bin's interior.

BRIEF DESCRIPTION OF THE DRAWINGS

The foregoing aspects and many of the attendant advantages of the invention will become more readily appreciated as the same becomes better understood by reference to the following detailed description, when taken in conjunction with the accompanying drawings, wherein:

FIG. 1 is an end view of a storage compartment formed in accordance with the present invention in a first configuration and in a stowed position;

FIG. 2 is an end view of the storage compartment of FIG. 1 in a lowered position;

FIG. 4 is an end view of the storage compartment of FIG. 1 in a second configuration and in a stowed position;

FIG. 5 is end view of the storage compartment of FIG. 4 in a an lowered position;

DETAILED DESCRIPTION OF THE PREFERRED EMBODIMENT

Figure 3:
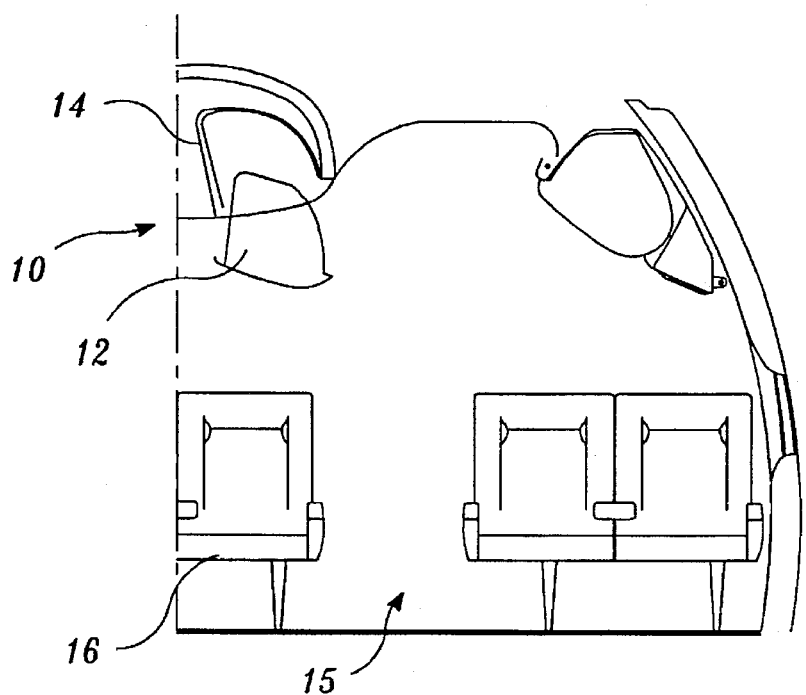
FIG. 3 is a schematic, partial cutaway view of half of the interior passenger compartment of an aircraft incorporating the storage compartment of FIGS. 1 and 2.
Figure 6:
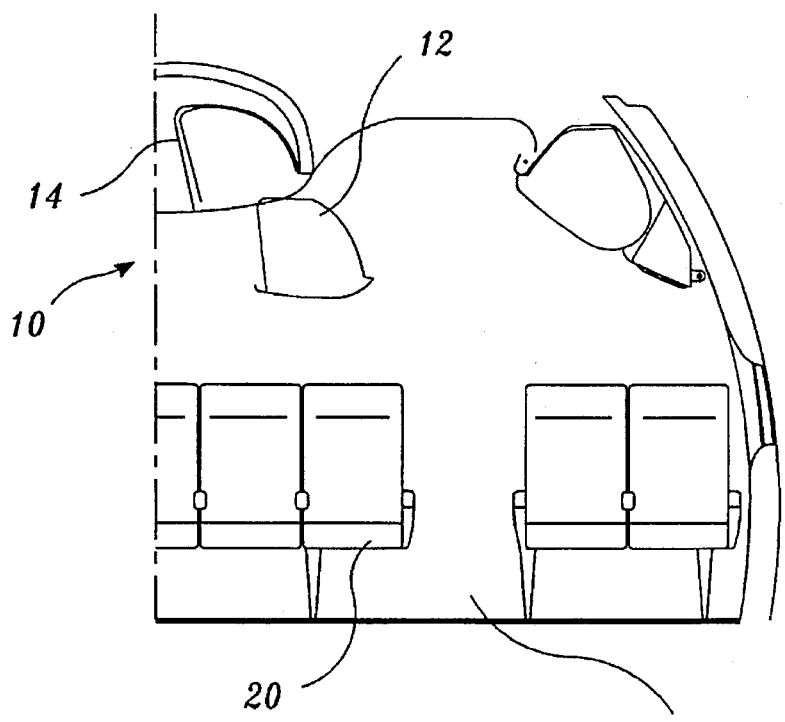
FIG. 6 is a schematic, partial cutaway view of half of the interior of an aircraft passenger compartment including the storage compartment of FIGS. 4 and 5.

FIGS. 1–6 illustrate a storage compartment 10 formed in accordance with the present invention. FIGS. 1–3 illustrate the storage compartment 10 in a first configuration in which the storage bin 12 of the storage compartment 10 opens by moving approximately linearly downward out of an overhead support structure 14. FIGS. 4–6 illustrate the storage compartment 10 in a second configuration in which the storage bin 12 swings downward and outward from the support structure 14 as best seen in FIG. 6.

The storage compartment 10 is generally operated in the first configuration illustrated in FIGS. 1–3 when the storage compartment is located directly over the passenger seat 16 (FIG. 3) closest the aisle 15 of the aircraft. In the first configuration, a passenger may grasp a handle (not shown) on the storage bin 12 and pull downward, causing the storage bin to move approximately linearly downward over the passenger seat 16. After the storage bin 12 has reached its lowermost point as shown in FIG. 3, a passenger may easily place luggage or other carry-on items within the interior of the storage bin. The seating configuration illustrated in FIG. 3 is representative of one seating configuration used for business or first-class seating configurations on some aircraft.

The second configuration of the storage compartment 10 shown in FIGS. 4–6 is most advantageously used when the storage compartment is located inward from the seat 20 located closest the aisle 22 as illustrated in FIG. 6. In the second configuration, the passenger opens the storage compartment by pulling down on the handle (not shown) of the storage bin. As a downward force is applied to the storage bin 12, the bin swings downward and outward toward the aisle 22. The lowered storage bin 12 is thus located closer to the aisle 22 than the stowed storage bin, allowing a passenger to easily place luggage or other carry-on items in the interior of the bin. Thus, the storage compartment 10 according to the present invention may be used for different seating configurations while still providing easy access to the interior of the storage bin.

The structure and operation of the first configuration of the storage compartment 10 will now be described by reference to FIGS. 1 and 2. The storage compartment 10 includes a support structure 14 that is attached to the fuselage or overhead support of an aircraft, or other vehicle that uses overhead storage compartments. The storage bin 12 (illustrated in phantom) is movably attached to the support structure 14 through the use of retraction mechanisms 24 attached to both ends of the storage bin. In FIGS. 1–2 and 4–5, the storage bin 12 has been shown in phantom so that the structure and operation of the retraction mechanism 24 may be more easily viewed and the following description more easily understood. The storage bin 12 itself is a box having a top 16 (FIG. 2), a bottom 17, a back wall 18, two opposing ends 26 and an opening 19 in its front surface into which luggage or other carry-on items may be inserted.

As described above, in the storage compartment's first configuration the retraction mechanism 24 allows the storage bin 12 to move from a stowed position (FIG. 1) in which the storage bin is nestled into the support structure 14 to an open and lowered position in which the storage bin is lowered approximately linearly downward from the support structure 14 (FIG. 2). In its lowered position, the storage bin 12 is also rotated slightly counter clockwise as illustrated in FIG. 2 so that a passenger may more easily access the interior of the storage bin.

The retraction mechanism 24 is located in a plane parallel to the ends 26 of the storage bin 12 and the ends of support structure 27. The retraction mechanism is formed of an idler link 30, a balance spring 32, a drive link 34, an upper link 36, a lower link 38 and a compression snubber 40. The retraction mechanism 24 also includes a slide track 44, a down stop 46 and a dash pot 48 that function as described below. Although FIG. 1 illustrates a single retraction mechanism, each storage bin 12 includes two retraction mechanisms 24, one retraction mechanism mounted on each end 26 of the storage bin.

The idler link 30 is a straight elongate member that is pivotally attached to the end 27 of the support structure 14 at its upper end by a pivot 50 located at a point near the ceiling of the support structure. The opposite end of the idler link 30 is pivotally attached to the end of the drive link 34 and the end of the balance spring 32 by a pivot 52. The pivot 52 extends through the ends of the idler link 30, balance spring 32 and drive link 34 and into an upward facing arcuate slot 54 in the slide track 44. The pivot 52 is anchored within the slot 54 such that it is prevented from moving into or out of the slot 54 but allowed to slide freely within the arcuate slot 54. Anchoring the pivot pin 52 within the slot 54 of the slide track 44 prevents the ends of the idler link 30, balance spring 32 and drive link 34 from moving out of plane during retraction and extension of the retraction mechanism 24 as described below.

The balance spring 32 is a straight elongate compression spring that is pivotally attached to the formed end 27 of the support structure 14 at one end by a pivot 54 and is pivotally connected to the pivot 52 at its opposite end. The balance spring 32 includes a rod that is telescopically mounted within a cylinder in a manner well known in the art. The balance spring 32 is attached between pivots 52 and 54 in a precompressed state so that it exerts an inward directed force on the idler link 30 and drive link 34 as described in more detail below.

The drive link 34 is a straight elongate member having downward facing arcuate portion 53 at one end. The outer end of the arcuate portion 53 is pivotally connected to the pivot 52 while the opposite end 58 of the drive link 34 is pivotally connected to a lug 55 located on the lower end of the upper link 36 by a pivot 56.

The upper link 36 is a straight elongate member that includes a downward facing arcuate portion 57 at its lower end. The lug 55 is located adjacent the intersect of the arcuate portion 57 of the upper link 36 and the straight portion of the upper link. The end of the arcuate portion 57 is pivotally connected to a pivot boss 60 by a pivot 62. The pivot boss 60 is a reinforced mounting boss that is attached to the upper inside corner of the end 26 of the storage bin 12. The opposite end of the upper link 36 is pivotally connected to a pivot 64. The pivot 64 is mounted on an extension bracket (not shown) that is fixedly attached to and extends upward from the top of the support structure 14.

The lower link 38 is a straight elongate member that is pivotally attached to the end 27 of the support structure 14 at one end by a pivot 70. The opposite end of the lower link 38 is pivotally attached to a pivot boss 72 by a pivot 74. The pivot boss 72 is a structural reinforcement on the end 26 of the bin 12 adjacent the back wall 18. The pivot boss 72 is spaced downward from the upper pivot boss 60 approximately halfway between the top 16 and bottom 17 of the storage bin 12. The lower mechanism link 38 is also pivotally connected to the lower end of the compression snubber 40 by a pivot 80. The pivot 80 is located slightly inward from the pivot 74 along the lower link's length. The lower link 38 also includes a bearing or hole 82 that is spaced inward along the length of the link from the pivot 80. The hole 82 is sized to receive a pivot 84 mounted on a pivot boss 86 when the retraction mechanism is in the second configuration as described below. The pivot boss 86 is a structural reinforcement located on the end 26 of the storage bin 12 at approximately the same height as the pivot boss 72 but spaced outward further front the back wall 18.

The compression snubber 40 is a straight elongate snubber having a rod telescopically mounted within a cylinder in a manner well known in the art. The compression snubber 40 resists being compressed, however, when a sufficient compression force is placed on the snubber, the rod retracts into the cylinder. The compression snubber could be a hydraulic, spring, air or other type of snubber.

One end of the compression snubber 40 is attached to the lower link 38 by pivot 80 and the opposite end of the compression snubber is attached to the outer end of the arcuate flange 57 of the upper link 36 by a pivot 90.

As discussed above, the storage compartment 10 also includes a down stop 46 and a dash pot 48. The down stop 46 and dash pot 48 are mounted on the end 27 of the support structure 14. The down stop 46 is spaced downward from the ceiling of the support structure 14 and outward from the rear wall of the support structure. The down stop contacts the drive link 34 to prevent further downward movement of the storage bin 12 as described in more detail below. The dash pot 48 is a hydraulic, spring, or other type of dash pot. The dash pot 48 is located on the end 27 spaced downward from the ceiling of the support structure 14 and is positioned to contact the idler link 30 in order to cushion the upward movement of the storage bin 12 as discussed in more detail below.

As illustrated in FIG. 1, when the storage bin 12 is in its stowed position, it is nestled within the support structure 14. In the stowed position, the balance spring 32 is fully extended such that the pivot pin 52 and thus the attached ends of the idler link 30 and drive link 34 are biased to the right end of the slot 54 is shown in FIG. 1. Biasing the drive link 34 to the right as illustrated in FIG. 1 forces the upper link 36 upward thus biasing the storage bin 12 into the stowed position. It is advantageous that the balance spring 32 provide a sufficient force to assist the storage bin 12 in moving upward after a passenger has placed luggage or other carry-on items in the storage bin.

In the preferred embodiment, the balance spring 32 provides a sufficient force to the drive link 34 to assist in lifting 20 pounds of luggage within the storage bin. When the storage bin 12 reaches its uppermost stowed position (FIG. 1), the idler link 30 contacts and compresses the dash pot 48 thus preventing the idler link and storage bin from moving beyond a predetermined stowed position. It is advantageous that the dash pot 48 be spring or otherwise loaded so that it cushions the movement of the idler link 30 and thus storage bin 12 into the stowed position. The cushioning effect of the dash pot 48 helps to prevent the storage bin 12 from crashing or otherwise noisily contacting the support structure 14 during retraction. Once the storage bin 12 reaches its fully stowed position, a latch mechanism (not shown) on the storage bin engages a retaining mechanism on the support structure 14 to ensure that the storage bin does not open unexpectedly during operation of the aircraft.

Once the latch mechanism (not shown) is disengaged from the support structure 14, the storage bin 12 begins to move downward under the weight of luggage in the bin. In the preferred embodiment, if the luggage in the bin weighs less than 26 pounds, the bin must be manually pulled down. The storage bin 12 is prevented from moving quickly downward by the action of the compression snubber 40. As discussed above, the compression snubber 40 resists compression. As the storage bin 12 moves downward, the arcuate portion 57 of the upper link 36 rotates around the pivot 62 compressing the compression snubber 40. The compression snubber 40 resists being compressed thus slowing the downward movement of the storage bin 12.

As the storage bin 12 continues to move downward, the upper link 36 pivots on pivots 64 and 62 while the lower link 38 pivots on pivots 70 and 74 allowing the storage bin to move approximately linearly downward away from the support structure 14. In addition to moving downward, the location of the pivot points 64, 62, 70, and 74 also cause the storage bin 12 to rotate counter clockwise slightly as illustrated in FIG. 2. This slight counter clockwise rotation improves a passenger's access to the storage bin's interior.

The down stop 46 is positioned on the end support wall 27 such that it contacts the drive link 34 when the storage bin 12 reaches a predetermined lowered position as illustrated in FIG. 2. The down stop 46 thus prevents the storage bin 12 from moving downward beyond the predetermined position.

It has been found advantageous to connect the upper ends of the upper links 36 located on either end of the storage bin 12 to ensure that the storage bin does not twist or deform while raising or lowering. To ensure that the upper links 36 pivot at the same rate of angular rotation, a torsion member (not shown) is connected between the upper links at the pivots 64. The torsion member could be a torsion tube, bar or other member that ensures that the upper links 36 move at approximately the same rate of angular rotation.

One advantage of the present invention is that the retraction mechanism 24 may be easily reconfigured from the first configuration illustrated in FIGS. 1–3 to the second configuration illustrated in FIGS. 4–6. In FIG. 4–6, the storage bin 12 not only translates linearly downward from the support structure 14, it also swings outward from the support structure as best illustrated in FIG. 6. In the second configuration, the same idler link 30, balance spring unit 32, drive link 34, upper link 36, lower link 38 and dash pot 48 are utilized. However, the down stop 46 is repositioned, the compression snubber 40 is replaced with a tension snubber 100 and the lower mechanism link 38 is pivotally attached to the storage bin 12 at the pivot 84 as opposed to pivot 74.

Except as described below, the structure and operation of the retraction mechanism 24 in the second configuration is the same as the structure and operation of the retraction mechanism 24 in the first configuration and may be understood by reference to the detailed discussion of the first configuration. The structure of the storage compartment 10 in the second configuration that is the same as the structure in the first configuration is identified using the same reference numerals as used in the first configuration.

In the second configuration, the lower link 38 is detached from the pivot 74 and compression snubber 40. The lower link 38 is then repositioned and reattached to the storage bin 12 by placing the hole 82 in the lower link over the pivot 84 and securing it in place. The upper end of the compression snubber 40 is detached from the pivot 90 and the compression snubber removed. The compression snubber 40 is then replaced by a tension snubber 100. The tension snubber 100 is an elongate member consisting of a rod telescopically mounted with a cylindrical housing as commonly known in the art. The tension snubber 100 may be a hydraulic, spring, air or other type of snubber that resists extension of the snubber. One end of the tension snubber 100 is pivotally attached to the arcuate portion 57 of the upper link 36 by pivot 90. The opposite end of the tension snubber 100 includes a side mounted lug 102 that is pivotally attached to the end of the lower link 38 by pivot 104.

Repositioning and reattaching of the lower link 38 allows the storage bin 12 to swing outwardly from the rear wall of the support structure 14 as it is lowered as illustrated in FIGS. 5 and 6. In a manner similar to that described with respect to the first configuration, the balance spring 32 provides a force that biases the storage bin 12 into the stowed position. However, repositioning the lower link 38 requires that a tension snubber 100 be used to prevent undesirable rapid downward movement of the storage bin 12 upon unlatching as opposed to the compression snubber 40 used in the first configuration.

In the second configuration, as the storage bin 12 moves downward and outward, the distance between the arcuate end 57 of the upper link 36 and the end of the lower link 38 increases. Thus, in order for the storage bin 12 to move downward, the tension snubber 100 must be elongated. The tension snubber 100 resists elongation, thus preventing undesirable rapid downward movement of the storage bin 12.

In order for the storage bin 12 to be allowed to move outward in the second configuration, the down stop 46 must be moved further outward from the rear wall of the support structure 14. After the down stop 46 is repositioned, it functions in a manner similar to that described with respect to the first configuration. The down stop 46 contacts and stops further movement of the drive link 34 when the storage bin 12 has reached its lowered position (FIG. 5). The dash pot 48 functions in the second configuration in a similar manner as in the first configuration. The dash pot 48 contacts and cushions the movement of the idler link 30 as the storage bin moves into its stowed position, thus cushioning the movement of the storage bin.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. An over head storage compartment for use in an aircraft, the storage compartment comprising:

an overhead support structure coupled to an interior of an aircraft fuselage;

a storage bin movably coupled to the overhead support structure; and a retraction mechanism connected between the storage bin and the overhead structure to allow the storage bin to move between a stowed position approximately linearly downward to a lowered position in a first configuration and to move between a stowed position downward and outward to a lowered position in a second configuration wherein the storage bin is spaced farther outward in the lowered position in the second configuration than in the first configuration and, wherein the retraction mechanism includes upper and lower links both pivotally connected between the support structure and the storage bin, the lower link being reconfigurable to pivotally attach to the storage bin at one of two different locations depending upon whether the retraction mechanism is in the first configuration or the second configuration.

2. The overhead storage compartment of claim 1, wherein the retraction mechanism includes an idler link connected between the support structure and a drive link and a compression spring, the drive link being connected between the idler link and the upper link and the compression spring being connected between the idler link and the support structure.

3. The overhead storage compartment of claim 1, wherein the retraction mechanism includes a snubber connected between ends of the upper and lower links connected to the storage bin.

4. A method of reconfiguring an overhead storage compartment having a movably mounted storage bin that moves between a stowed position approximately linearly downward to a lowered position, in a first configuration, to allow the storage bin to move between the stowed position downward and outward to a lowered position, in a second configuration, wherein in the lowered position in the second configuration the storage bin is spaced further outward from the lowered position in the first configuration, the method comprising:

provinding an overhead storage compartment having a storage bin movably coupled to the storage compartment by upper and lower links that are both attached to the storage compartment at one end and are attached to the storage bin at an opposite end and a compression snubber attached between the ends of the upper and lower links attached to the storage bin;

detaching the end of the lower link attached to the storage bin and pivotally reattaching the lower link to the storage bin at a position spaced inward from a position at which the lower link was originally attached to the storage bin; and replacing the compression snubber with a tension snubber.

5. The method of claim 4, further comprising attaching the tension snubber to the upper link at one end attaching the tension snubber to the lower link at the position at which a lower link was originally attached to the storage bin at an opposite end of the tension snubber.

6. The overhead storage compartment of claim 3, wherein the snubber is a compression snubber.

7. The overhead storage compartment of claim 3, wherein the snubber is a tension snubber.

8. An overhead storage compartment for use in an aircraft comprising:

an overhead structure coupled to a ceiling of the aircraft;

a storage bin movably mounted within the overhead structure;

a retraction mechanism connected between the storage bin and the overhead structure, the retraction mechanism allowing the storage bin to move between a stowed position approximately linearly downward to a lowered position, the retraction mechanism including;

an upper link and a lower link both connected to the support structure at one end and to the storage bin at an opposite end;

a drive link connected between the upper link at one end and an idler link at the opposite end, the idler link being connected between the drive link at one end and the support structure at an opposite end; and a balance spring connected between the support structure at one end and an intersection of the idler link and the drive link at an opposite end.

9. The overhead storage compartment of claim 8, further comprising a compression snubber that is connected between the upper link and the lower link near the ends of the upper link and lower link that are connected to the storage bin.

10. The overhead storage bin of claim 8, wherein the idler link and drive link are slidably connected to the overhead structure.

11. An overhead storage compartment for use in an aircraft comprising:

an overhead structure coupled to a ceiling of the aircraft;

a storage bin movably mounted within the overhead structure;

a retraction mechanism connected between the storage bin and the overhead structure, the retraction mechanism allowing the storage bin to move between a stowed position and a lowered position spaced downward and outward from the overhead structure, the retraction mechanism including;

an upper and a lower link both connected between the overhead structure at one end and the storage bin at an opposite end;

a drive link connected between the upper link at one end and an idler link at an opposite end, the idler link being connected between the drive link at one end and the overhead structure at the opposite end; and a tension snubber connected between one end of the upper link and the end of the lower link connected to the storage bin.

12. The overhead storage compartment of claim 11, further comprising a balance spring connected between the overhead structure at one end and an intersection of the idler link and the drive link at an opposite end.

13. The overhead storage compartment of claim 11, wherein the idler link and drive link are slidably connected to the overhead structure.

* * * * *